United States Patent
Balke

[11] Patent Number: 5,254,031
[45] Date of Patent: Oct. 19, 1993

[54] TOOL FOR DISSECTING AND DISMEMBERING SLAUGHTERED STOCK

[76] Inventor: Axel Balke, Augustinerstr. 24, Solingen 19, Fed. Rep. of Germany

[21] Appl. No.: 886,905

[22] Filed: May 22, 1992

[30] Foreign Application Priority Data

May 27, 1991 [DE] Fed. Rep. of Germany ....... 4117229

[51] Int. Cl.⁵ ..................... B23D 35/00; A22C 17/04
[52] U.S. Cl. .................................. 452/149; 452/160; 30/355; 30/357
[58] Field of Search ................ 452/149, 160, 164; 30/355, 353, 357, 276, 501, 502

[56] References Cited

U.S. PATENT DOCUMENTS

| | | | |
|---|---|---|---|
| 3,745,869 | 7/1973 | Ludwig | 30/355 |
| 3,866,504 | 2/1975 | Claesson et al. | 30/355 |
| 4,027,390 | 6/1977 | Kendzior | 30/355 |
| 4,167,132 | 9/1979 | Zontelli | 30/357 |
| 4,516,323 | 5/1985 | Bettcher et al. | 452/149 |
| 5,022,299 | 6/1991 | Fischer et al. | 30/355 |

FOREIGN PATENT DOCUMENTS

| | | |
|---|---|---|
| 0120759 | 3/1984 | European Pat. Off. |
| 2331806 | 1/1975 | Fed. Rep. of Germany |
| 2728983 | 10/1984 | Fed. Rep. of Germany |
| 3927262 | 8/1989 | Fed. Rep. of Germany |
| 8017821 | 2/1982 | France |

*Primary Examiner*—Willis Little
*Attorney, Agent, or Firm*—Diller, Ramik & Wight

[57] ABSTRACT

In order to obtain absolutely smooth, splinter-free and bone meal-free separating surfaces, a tool for dissecting and dismembering slaughtered stock is configured as a circular or curved blade having a plurality of cutting edges (3) with intermediate cutting gaps (2), the cutting edges (3) exhibiting, at their end pointing in the direction of cutting, a concave area (4), which extends between two approximately equally tall cutting tips (6, 7), and an adjoining convex or straight area (5) sloping away counter to the direction of cutting.

24 Claims, 2 Drawing Sheets 5,254,031

TOOL FOR DISSECTING AND DISMEMBERING SLAUGHTERED STOCK

BACKGROUND OF THE INVENTION

The invention relates to a tool for dissecting and dismembering slaughtered stock of the meat industry.

Hitherto, slaughtered stock has been dissected and dismembered using saws which are suitable for cutting through the bones present in the slaughtered stock. These saws preferably exhibit side set teeth. For industrial meat processing, the saws are configured in the form of individual leaves or in the form of endless belts.

When sawing through bones, however, bone meal is formed, which attaches itself to the meat surrounding the bones. The bone meal obstructs further processing of the slaughtered stock, in particular clean stripping of the meat. Moreover, the bone meal rapidly assumes a black colouring, which lends the slaughtered stock an unattractive appearance. The bone meal is therefore usually rinsed off with water, which gives rise however to health risks due to the bacteria present in the water.

Furthermore, when sawing through the bones present in the slaughtered stock, bone splinters can easily be formed on that side of the bones on which the saw is guided out once the bone in question has been severed. The bone splinters lodge in the meat surrounding the bones and have to be laboriously removed from this.

SUMMARY OF THE INVENTION

The object of the invention is therefore to provide a tool for dissecting and dismembering slaughtered stock which avoids remnants of bone meal and guarantees an absolutely smooth, splinter-free dissection and dismemberment of the slaughtered stock.

This object is achieved, in respect of a tool of this kind, by the fact that the latter is configured as a circular or curved blade having a plurality of cutting edges with intermediate cutting gaps, the cutting edges exhibiting, at their end pointing in the direction of cutting, a concave area, and an adjoining convex or straight area sloping away counter to the direction of cutting.

It has been shown that, using the tool according to the invention, a perfectly smooth, splinter-free dissection and dismemberment of slaughtered stock is possible, the generation of bone meal being very largely avoided.

In a preferred embodiment of the invention, the concave area extends between two approximately equally tall cutting tips.

The concave area can also, on the other hand, extend between two cutting tips, of which the front tip in the direction of cutting is somewhat lower than the other tip. In this case, the rear tip in the direction of cutting can exhibit a rounded form.

Preferably, the cutting gaps are configured as concave indentations, so that the cutting gap bottom continuously merges into the opposite-facing flanks of two neighbouring cutting edges.

The cutting gap bottom, including the two opposite-facing flanks, is preferably obliquely scarfed.

Furthermore, the cutting edges can be provided, at least partially, with a toothing. Preferably, the toothing is disposed in the convex area of the cutting edges.

The cutting gaps configured between the cutting edges prevent meat or fat being deposited on the cutting edges, in particular in a toothing of the cutting edges. When slaughtered stock is dissected and dismembered using the tool according to the invention, the meat or fat forces its way into the cutting gaps and is cut through cleanly. Where there are thick fat layers, in particular, an obliquely scarfed cutting gap bottom is advantageous, since this allows the fat layer to be cut through smoothly in the best possible manner.

The invention does not preclude the tool being used for purposes other than the dissection and dismemberment of slaughtered stock. In particular, the tool can also be used, under some circumstances, counter to the above-described direction.

A preferred illustrative embodiment of the invention is described in further detail below with reference to the drawing, in which:

DESCRIPTION OF THE PREFERRED EMBODIMENTS

Figure 1:
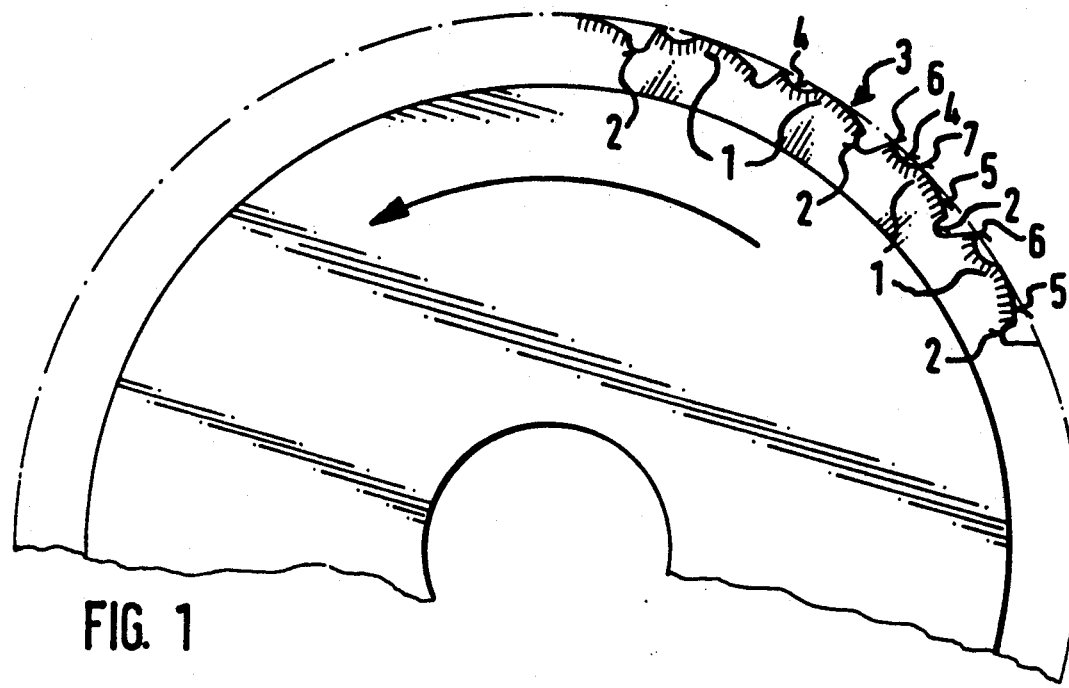
FIG. 1 shows a side view of the tool in a cutout representation.

The tool represented in FIG. 1 for dissecting and dismembering slaughtered stock is designed as a circular or curved machine blade. The blade exhibits a plurality of cutting teeth 1, which are separated from one another by cutting gaps 2.

Each cutting tooth 1 is provided on its outer side with a cutting edge 3. The cutting edges 3 are composed of a concave area 4 and a convex area 5. The concave area 4 is disposed at the beginning, pointing in the direction of cutting, of each cutting edge 3, and extends between two approximately equally tall cutting tips 6 and 7. Adjoining the concave area 4 is found the convex area 5, the height of which slopes down counter to the direction of cutting of the blade.

As can be seen from the drawing, the cutting gaps 2 are of concave configuration, so that they continuously extend to the opposite-facing cutting tips 6 and 7.

Furthermore, the cutting gap bottom, including the opposite-facing flanks of the neighbouring cutting teeth, exhibits an obliquely scarfed area 8. In the cutting process, the fat forces its way into the cutting gaps 2, so that even thick layers of fat, in particular, are cut through cleanly, without the fat remaining caught on the cutting edges 3.

Figure 2:
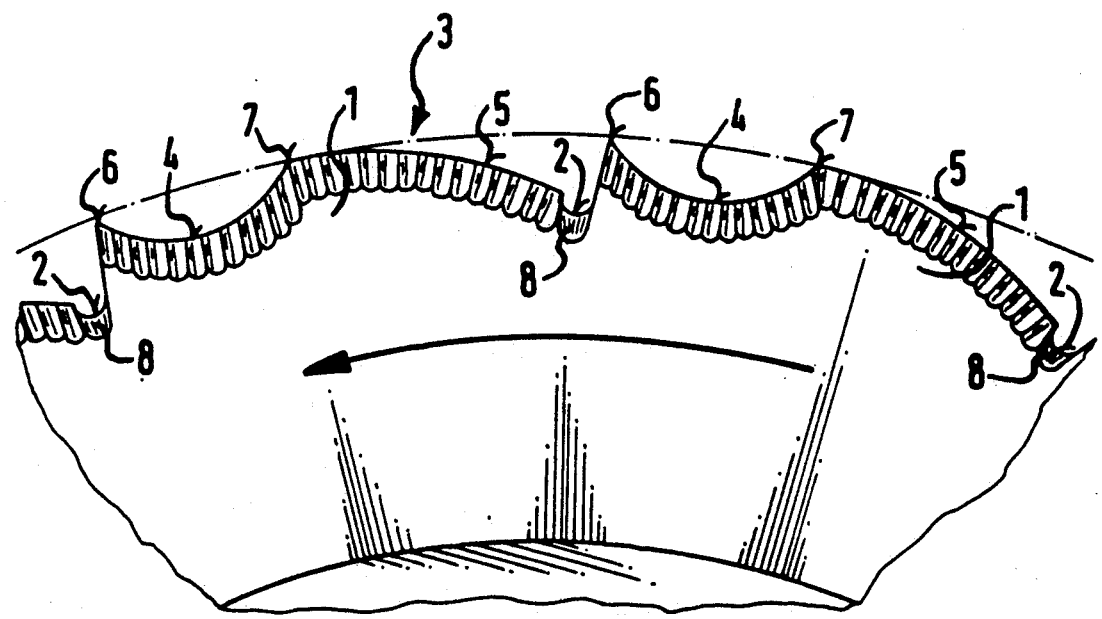
FIG. 2 shows an enlarged view of a part of the tool represented in FIG. 1.
Figure 3:
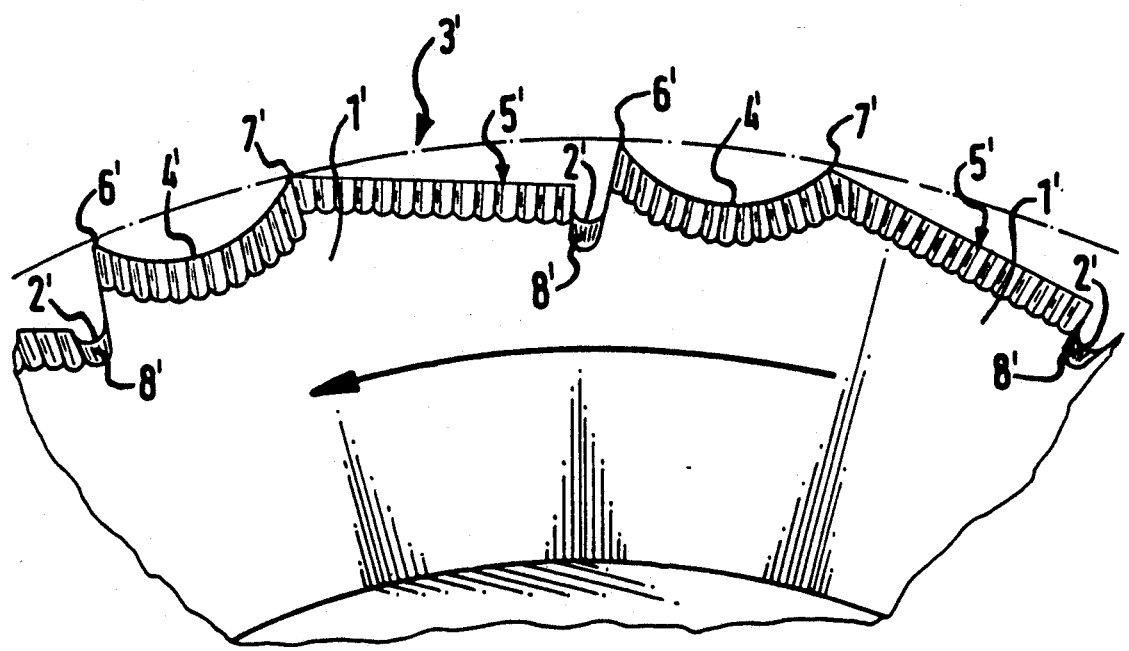
FIG. 3 shows an enlarged view of another tool of the invention.

In FIG. 3 a tool for dissecting and dismembering slaughtered stock is also designed as a circular or curved machine blade and includes a plurality of cutting teeth 1' which are similar to the cutting teeth 1 and thus include identically numbered through primed reference numerals. However, in lieu of the convex area 5 of each cutting tooth 1 of FIGS. 1 and 2, each cutting tooth 1' of FIG. 3 includes a straight area 5' which slopes away from its associated cutting tip 7' opposite the direction of blade movement toward its adjacent cutting gap 2'. Moreover, a front or leading cutting tip 6' of each cutting tooth 1' is somewhat lower or in a lower cutting plane than the adjacent higher cutting tip 7' of the same cutting tooth 1'.

I claim:

1. A cutting tool comprising a blade having a plurality of cutting teeth (1) spaced from each other by an intermediate cutting gap (2), each cutting tooth having a cutting edge (3), said blade being adapted for movement in a cutting direction, each cutting edge (3) including a concave area (4) at a leading edge of each cutting tooth with respect to the cutting direction, each cutting edge (3) further including a convex area (5) adjoining said concave area (4), and said convex area (5) includes a convex edge which slopes from a high point thereof adjacent said concave area (4) to a low point spaced therefrom in a direction opposite to said cutting direction.

2. The cutting tool as defined in claim 1 wherein each concave area extends between a leading edge cutting tip and a cutting tip at said high point.

3. The cutting tool as defined in claim 1 wherein each concave area extends between a leading edge cutting tip and a cutting tip at said high point, and said cutting tips lie in a generally common cutting plane.

4. The cutting tool as defined in claim 1 wherein each concave area extends between a leading edge cutting tip and a cutting tip at said high point, and said leading edge cutting tip lies in a cutting plane generally lower than a cutting plane of said high point cutting tip.

5. The cutting tool as defined in claim 1 wherein each concave area extends between a leading edge cutting tip and a cutting tip at said high point, and said high point cutting tip is rounded.

6. The cutting tool as defined in claim 1 wherein each intermediate cutting gap (2) is of an outwardly opening concave configuration.

7. The cutting tool as defined in claim 1 wherein each intermediate cutting gap (2) includes an obliquely scarfed area.

8. The cutting tool as defined in claim 1 wherein each intermediate cutting gap (2) is of an outwardly opening concave configuration, and each intermediate cutting gap (2) includes an obliquely scarfed area.

9. The cutting tool as defined in claim 1 wherein each cutting edge (3) is at least partially provided with toothing.

10. The cutting tool as defined in claim 1 wherein each convex area (5) is at least partially provided with toothing.

11. The cutting tool as defined in claim 3 wherein each intermediate cutting gap (2) is of an outwardly opening concave configuration.

12. The cutting tool as defined in claim 4 wherein each intermediate cutting gap (2) is of an outwardly opening concave configuration.

13. A cutting tool comprising a blade having a plurality of cutting teeth (1') spaced from each other by an intermediate cutting gap (2'), each cutting tooth having a cutting edge (3'), said blade being adapted for movement in a cutting direction, each cutting edge (3') including a concave area (4') at a leading edge of each cutting tooth with respect to the cutting direction, each cutting edge (3') further including a straight area (5') adjoining said concave area (4'), and said sttraight area (5') includes a straight edge which slopes from a high point thereof adjacent said concave area (4') to a low point spaced therefrom in a direction opposite to said cutting direction.

14. The cutting tool as defined in claim 13 wherein each concave area extends between a leading edge cutting tip and a cutting tip at said high point.

15. The cutting tool as defined in claim 13 wherein each concave area extends between a leading edge cutting tip and a cutting tip at said high point, and said cutting tips lie in a generally common cutting plane.

16. The cutting tool as defined in claim 13 wherein each concave area extends between a leading edge cutting tip and a cutting tip at said high point, and said leading edge cutting tip lies in a cutting plane generally lower than a cutting plane of said high point cutting tip.

17. The cutting tool as defined in claim 13 wherein each concave area extends between a leading edge cutting tip and a cutting tip at said high point, and said high point cutting tip is rounded.

18. The cutting tool as defined in claim 13 wherein each intermediate cutting gap (2') is of an outwardly opening concave configuration.

19. The cutting tool as defined in claim 13 wherein each intermediate cutting gap (2') includes an obliquely scarfed area.

20. The cutting tool as defined in claim 13 wherein each intermediate cutting gap (2') is of an outwardly opening concave configuration, and each intermediate cutting gap (2') includes an obliquely scarfed area.

21. The cutting tool as defined in claim 13 wherein each cutting edge (3') is at least partially provided with toothing.

22. The cutting tool as defined in claim 13 wherein each convex area (5') is at least partially provided with toothing.

23. The cutting tool as defined in claim 15 wherein each intermediate cutting gap (2') is of an outwardly opening concave configuration.

24. The cutting tool as defined in claim 16 wherein each intermediate cutting gap (2') is of an outwardly opening concave configuration.

* * * * *